United States Patent [19]
Hilke et al.

[11] Patent Number: 4,741,683
[45] Date of Patent: May 3, 1988

[54] VULCANIZING MOLD FOR VEHICLE TIRES

[75] Inventors: Rainer Hilke, Starnberg; Gerhard Schmaderer, Cham, both of Fed. Rep. of Germany

[73] Assignee: A-Z Formen- und Maschinenbau GmbH, Munich, Fed. Rep. of Germany

[21] Appl. No.: 64,991

[22] Filed: Jun. 19, 1987

[30] Foreign Application Priority Data

Jun. 23, 1986 [DE] Fed. Rep. of Germany ... 8616697[U]

[51] Int. Cl.$^4$ ............................................ B29C 35/00
[52] U.S. Cl. ....................................... 425/47; 425/195
[58] Field of Search ............... 425/28 R, 47, 182, 193, 425/195

[56] References Cited

U.S. PATENT DOCUMENTS

| | | | |
|---|---|---|---|
| 3,520,024 | 7/1970 | Caretta et al. | 425/47 |
| 3,682,576 | 8/1972 | Gross | 425/47 |
| 3,910,735 | 10/1975 | Caretta | 425/47 |
| 4,059,375 | 11/1977 | Koch et al. | 425/47 |
| 4,563,139 | 1/1986 | Yokoyama et al. | 425/47 |

FOREIGN PATENT DOCUMENTS

| | | | |
|---|---|---|---|
| 2139011 | 2/1973 | Fed. Rep. of Germany | 425/47 |
| 2420404 | 11/1975 | Fed. Rep. of Germany | 425/47 |
| 419588 | 3/1967 | Switzerland | 425/47 |

*Primary Examiner*—Willard Hoag
*Attorney, Agent, or Firm*—Becker & Becker, Inc.

[57] ABSTRACT

A vulcanizing mold for tires of vehicles. The mold includes an upper and lower sidewall part, and a closure ring that has a conical inner surface and is intended for a tread-molding ring. The guide mechanisms are provided on the conical inner surface for guiding, in a sliding manner, sliding shoes. Segments that form the tread-molding ring are rigidly connected to the sliding shoes. Sheets of sliding material are disposed on those portions of the conical inner surface that are subjected to pressure.

13 Claims, 3 Drawing Sheets

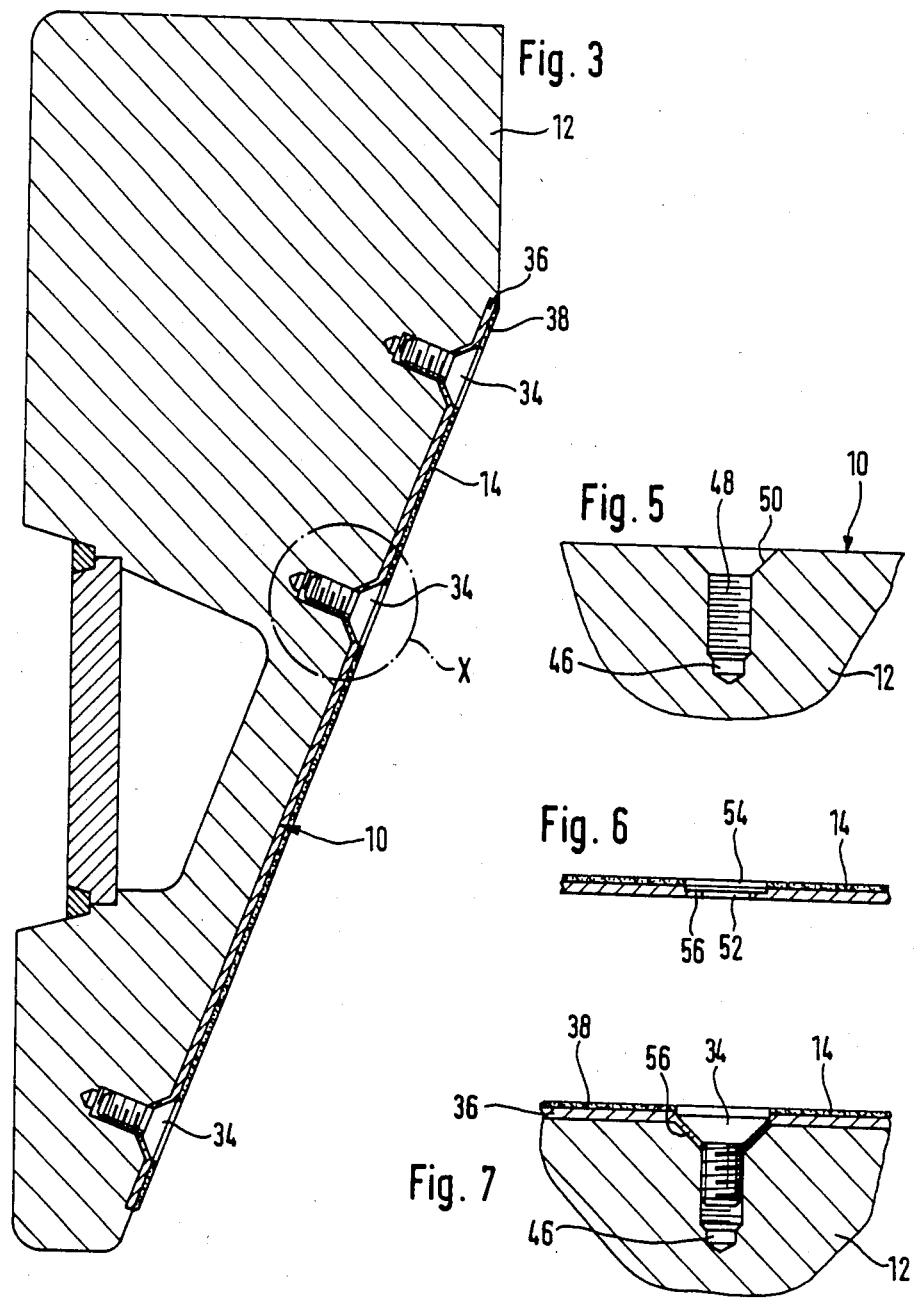

VULCANIZING MOLD FOR VEHICLE TIRES

BACKGROUND OF THE INVENTION

The present invention relates to a vulcanizing mold for tires of vehicles, with said mold including an upper and a lower sidewall part, and a closure ring that has a conical inner surface and is intended for a tread-molding ring. Guide mechanisms are provided on the conical inner surface for guiding, in a sliding manner, sliding shoes. Segments that form the tread-molding ring are rigidly connected to the shoes.

A tire vulcanizing mold of this general type is known from German Gebrauchsmuster No. 76 24 227. With such a tire vulcanizing mold, the treadmolding ring is divided into segments that are guided on sliding shoes. The latter can be mounted on a conical inner surface of a closure ring in such a way as to be slidingly movable, so that when the closure ring is lowered, the segments move radially inwardly.

The forces that are transmitted during this procedure are relatively great. Pursuant to the aforementioned German Gebrauchsmuster No. 76 24 227, in order to counteract the correspondingly great wear, the parts used to transmit the force are replaceable. The transmission of force is effected via special slide bars, which are replaceably disposed on that portion of the sliding shoes that face the conical closure ring, are embodied as support elements on that surface thereof that faces the conical closure ring, and at that location are provided with a layer of sliding material.

However, the replacement of the sliding shoes, which is necessary anytime that the layer of sliding material wears away, is relatively expensive. Furthermore, with the heretofore known tire vulcanizing molds, as the wear of a given layer of sliding material increases, the tolerance range becomes reduced, so that it may be necessary to replace the sliding shoes even before the layer of sliding material on the sliding shoes has been completely worn off.

It is therefore an object of the present invention to provide a tire vulcanizing mold of the aforementioned general type where operation is possible over a long period of time without a noticeable increase in the tolerances.

BRIEF DESCRIPTION OF THE DRAWINGS

This object, and other objects and advantages of the present invention, will appear more clearly from the following specification in conjunction with the accompanying schematic drawings, in which:

FIG. 3 is a cross-sectional view through the inventive closure ring taken along the line 3—3 in FIG. 1;

FIG. 5 is an enlargement of the dot-dash encircled region x in FIG. 3 without the sheet of sliding material;

FIG. 6 is a cross-sectional view of the sheet of sliding material with a hole; and FIG. 7 is another enlargement of the dot-dash encircled region x in FIG. 3.

SUMMARY OF THE INVENTION

Figure 1:
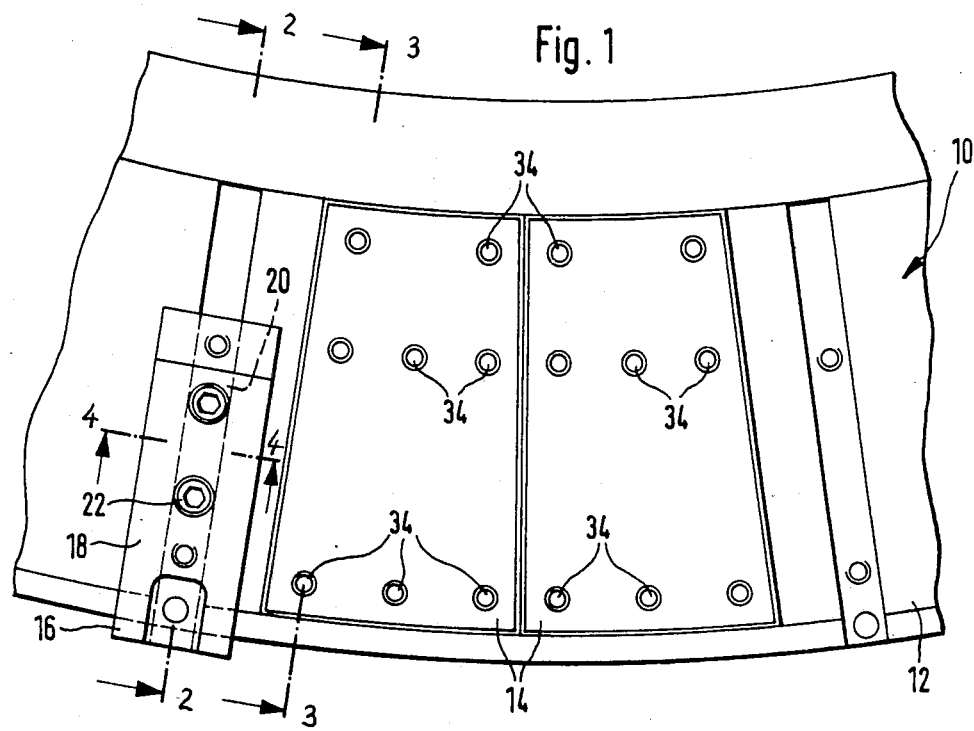
FIG. 1 is a view of one exemplary embodiment of the present invention showing two sheets of sliding material that are mounted directly adjacent one another on the conical inner surface of a closure ring.

The tire vulcanizing mold of the present invention is characterized primarily in that sheets of sliding material are disposed on those portions of the conical inner surface of the closure ring that are subject to pressure. The sheets of sliding material, which can be detachably secured to the conical inner surface, can include a copper-containing composition in which graphite is incorporated.

Since the invention sheets of sliding material are independent parts, there results above all the advantage that, in contrast to the situation where a part is coated with a sliding material layer, it is not necessary pursuant to the present invention to replace the part that carries the sheet of sliding material. Rather, it is merely necessary to replace the sheet of sliding material itself. It is particularly advantageous that the sheet of sliding material is not provided on a sliding shoe, which has a relatively small surface available for the transmission of force, but rather the sheet is provided on the conical inner surface of the closure ring, because in this way a relatively large surface is available, which leads to a relatively low pressure per unit area.

In return, due to this low pressure per unit area, the wear on the sheets of sliding material can be kept within in very narrow limits, which is beneficial to the precision with which the closure mold can be guided.

Furthermore, the inventive sheets of sliding material can be secured in a very simple manner, and are easy to replace.

Pursuant to a particularly preferred embodiment of the present invention, the guide mechanisms on the conical inner surface of the closure ring have a cross-sectional shape that is essentially T-shaped, and are detachably mounted to this conical inner surface. Furthermore, the sliding shoes are integrally formed on the segments. That surface of the guide mechanisms that faces the conical inner surface is provided with a further sheet of sliding material. The guide mechanisms include a crosspiece and a spacer that can be separated from the latter. The further sheet of sliding material is disposed on that surface of the crosspiece that faces the conical inner surface, and extends in one piece over the crosspiece. With this embodiment, it is now also possible to provide the cooperating guide surfaces, i.e. the guide surfaces that face the conical inner surface of the closure ring and permit the segments to slide along the closure ring with very little wear when the latter is opened, with a sheet of sliding material.

By inventively providing those surfaces that are subject to wear with a sheet of sliding material, it is possible to avoid having to mechanically machine these surfaces and thereafter again apply thereto a new coating when wear has occurred. Pursuant to the present invention, it is merely necessary to unscrew a sheet of sliding material and replace it with a new one.

Since relatively thin sheets of sliding material are used, preferably sheets that are 1 to 5 mm thick, the required tolerances can be satisfactorily maintained, even where maximum wear has occurred.

Further specific features of the present invention will be described in detail subsequently.

DESCRIPTION OF PREFERRED EMBODIMENTS

Referring now to the drawings in detail, a total of sixteen sheets 14 of sliding material, which are distributed over the periphery, are screwed onto the conical inner surface 10 of a closure ring 12. At a given location two sheets 14 abut one another to form abutting pairs of the sheets 14. On both sides next to each sheet 14 of a pair of such sheets guide mechanisms 16 are secured to the inside of the closure ring 12. Each guide mechanism 16 has a crosspiece 18 that, via a spacer 20 which in FIG. 1 is covered by the crosspiece 18, is spaced from the conical inner surface 10 via screw connections 22.

Figure 2:
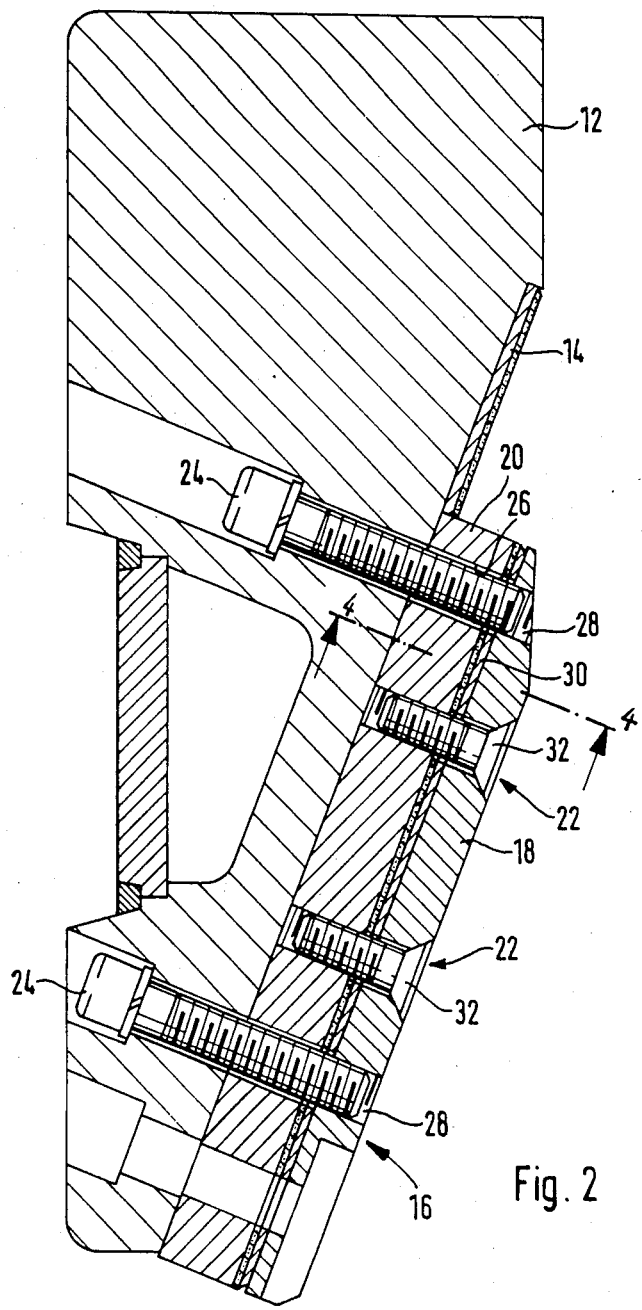
FIG. 2 is a cross-sectional view taken through the inventive closure ring along the line 2—2 in FIG. 1.

The configuration of the screw connections 22 is shown in detail in FIG. 2. Here, as well as in the rest of the figures, the same parts are designated by the same reference numerals. Two bolts 24 extend from the outside, through a portion of the closure ring 12 and through respective holes 26 in the spacer 20, and mesh in threads 28 in the crosspiece 18 of the guide mechanism 16. A sheet 30 of sliding material is provided on that entire surface of the crosspiece 18 that faces the spacer 20. An also illustrated in FIG. 1, the sheet 14 of sliding material is applied beyond the region of the guide mechanism 16.

Two additional screws 32 are also provided in order to reliably hold the sheet 30 of sliding material in place between the spacer 20 and the crosspiece 18. For this purpose, the screws 32 extend through holes in the crosspiece 18 and in the sheet 30, and mesh with threads in the spacer 20. Pursuant to a preferred embodiment, the screws 32 are countersunk.

With the multiple arrangement of bolts 24 and screws 32, the guide mechanism 16 can be easily removed from the closure ring 12 by loosening the bolts 24, which are accessible from the outside. The guide mechanism 16 can then be removed from underneath, without breaking down into individual pieces. The sheet 30 of sliding material can be replaced by loosening the screws 32.

The manner in which the sheets 14 of sliding material are secured in the closure ring 12 is illustrated in FIG. 3. Countersunk, flat-head screws 34 extend through an opening in the sheet 14, which at this location is shaped in conformity to the shape of the head of the screw 34, and mesh in internal threads in the closure ring 12. In the embodiment illustrated in FIG. 3, the sheet 14 of sliding material is composed of two layers, namely a support or base layer 36 and a lubricating layer 38. The support layer 36 is made of sheet steel, while the lubricating layer 38 is made of a bronze composition in which graphite is incorporated. With this material, due to the fact that graphite is constantly yet slowly given off, a constant, low coefficient of friction is achieved without the thickness of the sheet 14 being noticeably reduced.

As hereinafter used, "sliding material" means a solid support layer or sheet with a solid, self-lubricated layer As can be seen from FIG. 3, the screws 34 are distributed in a nonuniform manner over the conical inner surface 10 of the closure ring 12. This distribution of the screws 34, which can also be seen from FIG. 1, is intended to assure that the sheet 14 rests reliably and uniformly over the entire conical inner surface 10. This arrangement also prevents the sheet 14, which is relatively thin (approximately 3 mm), from becoming distorted.

Figure 4:
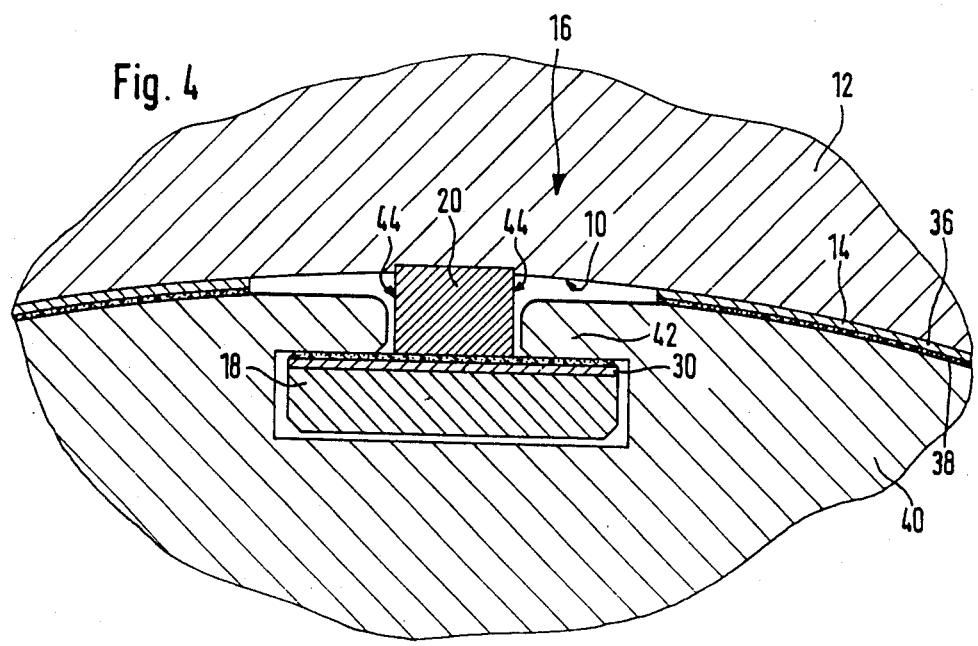
FIG. 4 is a cross-sectional view through a portion of the closure ring and a portion of an inventive segment, and is taken along the line 4—4 in FIG. 1 as well as along the line 4—4 in FIG. 2.

FIG. 4 illustrates the cooperation between a segment 40 and the guide mechanism 16. With this particularly preferred inventive embodiment, the actual sliding shoe 42 of the segment 40 is embodied in one piece with the latter. The sliding shoe 42 extends around the guide mechanism 16 on both sides, so that the segment 40 is supported on the guide mechanism 16 via the sheet 30 of sliding material that is provided on the crosspiece 18. In the other direction, the segment 40 is supported on the closure ring 12 via the sheet 14 of sliding material that is provided on the conical inner surface 10.

Thus, the sheet 14 transmits the forces that essentially occur during closure of the ring 12, whereas the sheet 30 transmits the forces that occur during opening of the ring 12. Since the forces that occur during closure are considerably greater, and since the sheet 14 has a considerably larger surface than does the sheet 30, one can expect an approximately equal pressure per unit of area, and hence an approximately equal wear. On the other hand, the lateral forces that are to be transmitted from the guide mechanism 16 are negligible, so that it is not necessary to provide additional sheets of sliding material on the side surfaces 44 of the spacer 20. In fact, it is desirable at this location to provide a certain amount of play so that the segments 40 can close without a seam about the non-illustrated tire blank.

FIG. 5 illustrates the preparation that is necessary on the closure ring 12 to produce a screw connection via the screws 34. First, a blind hole 46 is drilled that is later provided with an internal thread 48. A bevel 50 is then provided on the hole 46, for example with a countersunk angle of 90°; the bevel 50 is slightly greater than the head of the screw 34.

To provide for the screw connection, the sheet 14 of sliding material is prepared in the manner illustrated in FIG. 6. After a hole 52 has been produced, the sheet 14 is provided on the side of the lubricating layer 38 with a recess portion 54 that is concentric to the hole 52; this can be effected, for example, by a milling procedure. By way of example, if the sheet 14 has a thickness of 3 mm, then 2 mm could be milled away.

When the screw 34 is screwed in, the thin part 56 of the sheet 14 that surrounds the hole 52 deforms in an essentially conical manner, as shown in FIG. 7. In this way, a reliable yet detachable securing of the sheet 14 on the closure ring 12 is achieved without the danger existing that as wear of the sheet 14 continues, the surface of the screw 34 can contact the sliding surface of a segment 40; this sliding surface is not shown in FIG. 7.

Thus, in summary, with the vulcanizing mold for tires of vehicles, where segments 40 are guided on a closure ring 12 via a guide mechanism 16, the inventive sheet 14 of sliding material that is screwed to the closure ring 12 provides the advantage of improved precision, constant accuracy of size, and easier maintenance.

The present invention is, of course, in no way restricted to the specific disclosure of the specification and drawings, but also encompasses any modifications within the scope of the appended claims.

What we claim is:

1. A vulcanizing mold for tires of vehicles, with said mold including an upper and lower sidewall part, and a closure ring that has a conical inner surface and is intended for a tread-molding ring, with certain portions of said conical inner surface being subject to pressure; guide mechanisms are provided on said conical inner surface for guiding, in a sliding manner, sliding shoes; segments that form said tread-molding ring are rigidly connected to said sliding shoes; said vulcanizing mold further comprises:

first sheets of sliding material that are disposed on those portions of said conical inner surface that are subject to pressure.

2. A vulcanizing mold according to claim 1, in which each first sheet of sliding material is thin and is detachably secured to said conical inner surface of said closure ring.

3. A vulcanizing mold according to claim 2, in which said first sheet of sliding material has a thickness of from 1 to 5 mm.

4. A vulcanizing mold according to claim 2, in which said first sheet of sliding material includes a copper-containing composition in which graphite is incorporated.

5. A vulcanizing mold according to claim 2, in which each of said guide mechanisms has an essentially T-shaped cross-sectional shape, and is detachably mounted on said conical inner surface of said closure ring; and in which said sliding shoes are integrally formed on said segments.

6. A vulcanizing mold according to claim 5, in which said guide mechanisms have surfaces that face said conical inner surface and are provided with a second sheet of sliding material.

7. A vulcanizing mold according to claim 6, in which each of said T-shaped guide mechanisms has a crosspiece, and a spacer that is disposed between said conical inner surface and said crosspiece and can be detached from the latter; and in which said crosspiece has a surface that faces said conical inner surface and on which said second sheet of sliding material is disposed as a single piece that extends over said entire surface of said crosspiece.

8. A vulcanizing mold according to claim 7, which includes a screw connection for holding said second sheet of sliding material in place between said spacer and said crosspiece.

9. A vulcanizing mold according to claim 7, in which those portions of said conical inner surface of said closure ring to which said guide mechanisms are mounted are free of said first sheet of sliding material.

10. A vulcanizing mold according to claim 7, in which each of said first sheets of sliding material is secured to said conical inner surface of said closure ring via countersunk screws.

11. A vulcanizing mold according to claim 7, in which each of said sheets of sliding material is comprised of two layers, including a support layer of strong and resiliently tough material, and, disposed on said support layer, a lubricating layer of softer material.

12. A vulcanizing mold according to claim 11, in which said support layer is made of sheet steel, and said lubricating layer is a bronze composition in which graphite is incorporated.

13. A vulcanizing mold according to claim 11, in which said first sheets of sliding material are secured to said conical inner surface of said closure ring via countersunk screws, with said first sheets being provided therefor with countersink portions where said lubricating layer is absent and said support layer is conically bent to conform to the shape of said screws and of a corresponding conical cooperating surface on said conical inner surface.

* * * * *